Feb. 9, 1926.
N. H. GILMAN
VACUUM BRAKE
Filed March 16, 1925
1,572,526
2 Sheets-Sheet 1
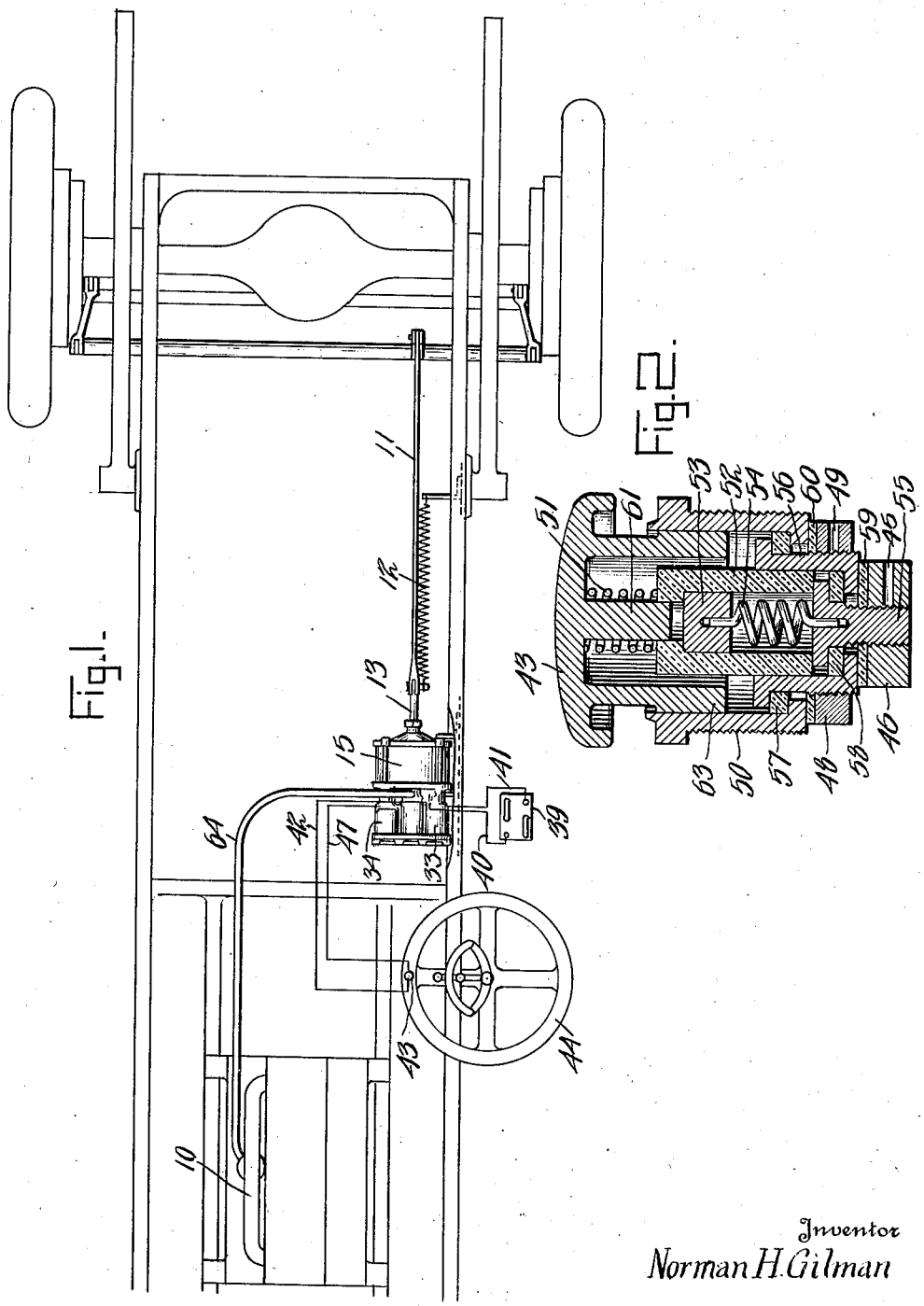
Inventor
Norman H. Gilman
By
Attorney

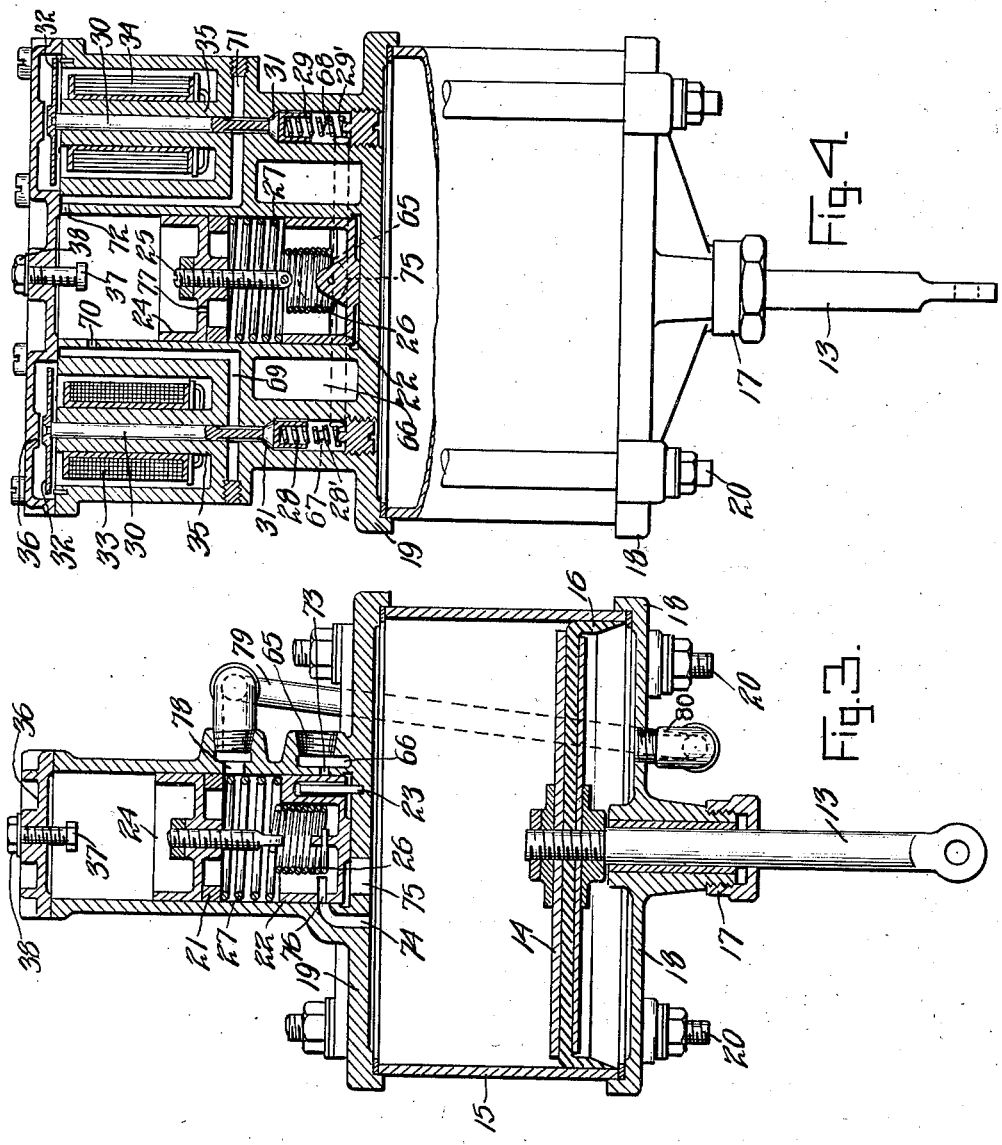

Patented Feb. 9, 1926.

1,572,526

UNITED STATES PATENT OFFICE.

NORMAN H. GILMAN, OF INDIANAPOLIS, INDIANA, ASSIGNOR TO CARL G. FISHER AND JAMES A. ALLISON, BOTH OF MIAMI, FLORIDA.

VACUUM BRAKE.

Application filed March 16, 1925. Serial No. 16,033.

*To all whom it may concern:*

Be it known that I, NORMAN H. GILMAN, a citizen of the United States, residing at Indianapolis, in the county of Marion and State of Indiana, have invented certain new and useful Improvements in Vacuum Brakes, of which the following is a specification.

My said invention relates to a vacuum brake for use primarily in motor vehicles and it is an object of the same to provide an effective brake of this character which shall be controlled electrically through intervention of the operator of the vehicle.
Another object of the invention is to provide a vacuum brake which shall have provision for "service" and "emergency" application the force of the application varying according to the need of the occasion.
Referring to the accompanying drawings which are made a part hereof and on which similar reference characters indicate similar parts, Figure 1 is a plan of parts of a motor vehicle showing my invention applied thereto;

Figure 2, a section through a push button on the steering wheel;

Figure 3, a section of the cylinder and piston of the vacuum mechanism and certain details connected therewith, and Figure 4, a section at right angles to Figure 3.

In the drawings reference character 10 indicates the manifold of an automobile having a brake rod 11 which may be connected in any conventional or desirable manner to the brakes for the wheels. A spring 12 normally moves the rod in the direction to release the brakes, the spring being connected at one end to a fixed part of the machine frame and at the other end to the rod 11 either directly or through intermediate parts.
The rod 11 is connected preferably through the intermediary of a foot lever, providing for manual operation of the brakes, to a piston rod 13 rigidly secured to a piston 14 mounted to move in a cylinder
15. The piston is provided with packing 16 secured thereto in any desirable manner and a gland 17 prevents the entrance of air at the rear side of the piston. In the embodiment of the invention here illustrated the heads 18 and 19 of the cylinder are removably secured together by bolts 20, said ends being separated by the cylindrical element 15.

The cylinder head 19 has an extension which is here shown as relatively long and narrow and is provided midway of its length with a cylindrical recess having rigidly secured therein, between its ends, a collar 21 which may be formed as an integral flange, if desired. A valve 22 is slidably located below the collar 21 and is guided by a pin 23 in a manner to prevent rotation in the recess which acts as a cylinder therefor. Another piston is located at 24 above the collar and these pistons are connected by means of a screw 25 in a centrally threaded boss on the piston 24 and a spring 26 secured at one end to a boss on the piston 22 and at the other end to the adjacent end of the screw 25. A spring 27 is interposed between the upper end of the skirt of valve 22 and the collar 21. This provides for yielding movement of either piston by the other and it will be evident that the piston 24, if moved upward, will draw the valve 22 after it, such movement being limited by the collar 21 and yieldingly limited by the spring 27 which, however, is weaker than spring 26.

The extension is also provided at each side of the central opening with smaller openings in which valves 28 and 29 are mounted to reciprocate. These openings are enlarged at the lower end to receive the valves which have stems 30 and tapered shoulders fitting against correspondingly tapered seats 31. The stems have longitudinal grooves above the shoulders to provide air passages when the valves are opened. Armatures 32 are attached to the valve stems at their upper ends and electromagnets 33 and 34 are provided for opening the respective valves against the tension of springs 28' and 29'. These electromagnets comprise coils supported about integral posts 35 co-axial with upwardly opening recesses in the extension on the head 19 and these recesses as well as the central recess are closed by a cap plate 36. A screw 37 engages a threaded opening at the center of the cap plate and provides adjustable means for limiting the travel of the piston 24. A lock nut 38 serves to hold the screw in adjusted position.

The means for energizing the electromagnets includes a battery 39 connected to the respective electromagnets by wires 40 and 41. A service wire 42 connects the electromagnet 33 to a push button switch indicated at 43 on the steering wheel 44. In Figure 2 an opening is indicated at 45 in a nut 46 for receiving the wire 42 which may be connected thereto by solder or otherwise. An emergency wire 47 connects the electromagnet 34 to the push button and this wire may be soldered or otherwise attached to a nut 48 which has an opening at 49 for the wire.

The means for securing the push button to the steering wheel comprises a threaded socket 50 in which the push button is mounted for up and down sliding movement. A spring 51 serves to hold it normally in its uppermost position. The spring bears at its lower end upon a hollow cylindrical block 52 of insulating material mounted centrally of the socket 50 which has a shoulder at its upper end to limit the upward movement of a block 53 supported by a compression spring 54 resting at its lower end on the head of a screw 55 on which the nut 46 is threaded. The screw 55 is supported in position on the socket 50 by a socket 56 having an outwardly extending flange at its upper end resting on a ring 57 of insulating material which in turn rests on an inwardly extending flange on the socket 50. At its lower end the socket 56 has an inwardly extending flange supporting a ring 58 of insulating material and the head of the screw rests on the latter ring while the nut 46 is supported from the lower end of the socket 56 by an insulating washer 59.

The nut 48 is threaded on the lower end of socket 56 to hold it in place, the nut being supported from the socket 50 by an insulating washer 60. The cylindrical member 52 rests at its lower end on the head of screw 55. The push button 43 is provided with a downwardly extending central boss 61 which serves to guide and support spring 51 and also to close a circuit through the service wire 42, nut 46, screw 55, spring 54, block 53, push button 43 and socket 50 which is grounded on the steering wheel. The connection of the service wire to the electromagnet 33 and by wire 41 to battery 39 causes the coil of the electromagnet to be energized so as to pull down its armature 32 and depress the valve 31 to open a passage from the air chamber below the valve as hereinafter described.

Further depression of the push button closes a circuit through emergency wire 47, nut 48, socket 56, the depending flange 63 of the push button and the socket 50 to ground on the steering wheel. The connection of wire 47 at the other end of the coil of electromagnet 34 and the battery 39 energizes the electromagnet to pull down its armature and open the right-hand valve 31 for purposes hereinafter described.

The means for creating a suction on the piston 14 to pull on the connecting rod 13 and apply the brakes against the tension of the spring 12 includes a pipe 64 connected at one end to the intake manifold 10 and at the other end having a threaded connection at 65 to the upward extension of the cylinder head 19. A passage 66 leads from the threaded opening 65 to ports 67 and 68 opening into the chambers below the respective valves 28 and 29. A passage 69 above the valve 28 leads to a port 70 opening into the central recess of the extension on head 19 near the outer end thereof. Another port 73 leads from the passage 66 into the central chamber adjacent the lower end thereof. A short passage 74 leads through the head 19 to the central chamber and a port 75 opens directly through the head into said chamber. The valve 22 has a port 76 at one side registering with passage 74 for equalizing the pressure between the pistons and in the cylinder 15 when the passage 74 registers with port 76. A port 77 in the piston 24 provides means for equalizing the pressure in the space at the upper part of the cylinder and in the space between the pistons.

In the operation of my device a service application is made, as previously indicated, by depressing the push button sufficiently to close the circuit through the service wire and the electromagnet 33 thereby opening the valve 28. The connection from the intake manifold will now operate through passage 66, port 67, passage 69 and port 70 to create a vacuum in the chamber above the piston 24 thus drawing the piston upward in said chamber. The upward limit of the movement of the piston is indicated by the port 70 as the suction is cut off when this port is closed by the skirt of the piston. As the piston 24 moves up it drags after it the valve 22 by means of the spring 26, the rate and extent of upward movement of the valve 22 being determined by the difference in strength of the springs 26 and 27. The upward movement of the valve 22 uncovers port 73 and establishes communication between said port and port 75 whereupon suction from the intake manifold exhausts the air in the cylinder 15 and moves the piston 14 with consequent relatively slow application of the brakes.

Further depression of the push button closes not only the circuit through the service wire but also the circuit through the emergency wire 47, as above explained, whereupon the valve 29 is also moved to open the passage 71. The suction from the intake manifold now operates not only through the passages described in connection with the service application but also acts through port 73, passage 66, port 68, passage 71 and port 72 to draw the piston 24 to the extreme upper end of its chamber or so far as permitted by the screw 37. This moves the piston 22 to its extreme upward position opening the passage 74 as well as the port 75 and permitting the suction of the intake manifold to exhaust the air suddenly from the cylinder 15 thereby making an emergency application of the brakes.

When the push button is released to break the circuits the electromagnets are de-energized, closing the valve 28 or both valves 28 and 29 as the case may be and cutting off the suction in the chamber above the piston 24. This permits the piston 24 to begin its downward movement under the impetus of the spring 27 which action is facilitated by entrance of air through a port 78 which connects with a pipe 79 opening at its other end into the cylinder at 80. Connection is made to the cylinder so as to avoid entrance of dirt into the cylinder 15 and connected parts from the outer air and so as to balance the pressure at opposite sides of the piston 14. The air from the cylinder passes through the port 77 into the upper chamber to break the vacuum and as soon as the valve 22 has moved down far enough to cause the port 76 to register with passage 74 it also breaks the vacuum in the cylinder 15, thereby facilitating the brake releasing action of the spring 12.

It will be plain to anyone familiar with vacuum operated brakes that there can be a variation in vacuum of from zero to as high as 13 lbs., depending on the position of the carbureter throttle and the speed of the engine pistons. The proper vacuum required for service brake operation depends upon the braking effort required and the size of piston 14 and its leverage.

In the device illustrated about 2 pounds per square inch vacuum is required. Therefore, a further object of this invention is to provide a balance between the suction operating on piston 14 and the controlling piston 24 and control valve 22, so that any vacuum pressure beyond the 2 pounds required will not be transmitted to piston 14. This is accomplished by adjusting the difference in tension of spring 26 and compression of spring 27 to the predetermined vacuum pressure. Since the pressure on the lower side of valve 22 is the same as that on the upper side of piston 24, when port 73 is uncovered the same pressure operating on 24 tending to pull valve 22 upward is on the under side of 22 tending to pull downward. This 2 lbs. pressure is thus maintained by this balanced condition and communicated through ports 74 and 75 to operate piston 14.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. In an automobile, braking means, vacuum operating means therefor connected to the intake manifold, electrical controlling means or the operating means including a circuit closer, and connections for manually actuating the circuit closer to cause either service or emergency application of the braking means, substantially as set forth.

2. In an automobile, braking means, vacuum operating means therefor connected to the intake manifold, electrical controlling means for the operating means including a push button on the steering wheel, means for causing a service application of the brakes by depression of the push button, and means for causing an emergency application by further depression thereof, substantially as set forth.

3. In a vehicle, a brake, suction actuating operating means therefor including a plurality of air-passages, a valve in each passage, and means for opening said valve simultaneously for an emergency operation or a single valve for a service operation, substantially as set forth.

4. A braking mechanism as in claim 3 including an electromagnet for each valve, normally open circuits for said electromagnets, and means for closing each of the circuits for an emergency operation or a single circuit for a service operation, substantially as set forth.

5. In a motor vehicle, braking means, a piston connected thereto, a pipe leading from the intake side of the motor for exhausting the air over the piston, a plurality of passages leading from said pipe through the cylinder head, a valve normally closing said passages, and means for lifting said valve to varying heights for opening the respective passages, substantially as set forth.

6. In a motor vehicle, braking means, a piston connected thereto, a pipe leading from the intake side of the motor for exhausting the air over the piston, a plurality of passages leading from said pipe through the cylinder head, a valve normally closing said passages, and connections from said pipe for lifting said valve, substantially as set forth.

7. A braking mechanism as in claim 6, with electrical controlling means for said lifting means, substantially as set forth.

8. In a motor vehicle, braking means, a piston connected thereto, a pipe leading from the intake side of the motor for exhausting the air over the piston, a plurality of passages leading from said pipe through the cylinder head, a valve normally closing said passages, a piston for lifting said valve, a vacuum chamber at one side of the piston, independent passages from said pipe to said chamber opening thereinto at different heights, and means for selectively controlling said passages, substantially as set forth.

9. In a motor vehicle, braking means, a piston connected thereto, a pipe leading from the intake side of the motor for exhausting the air over the piston, a plurality of passages leading from said pipe through the cylinder head, a valve normally closing said passages, a piston for lifting said valve, a vacuum chamber at one side of the piston, independent passages from said pipe to said chamber opening thereinto at different heights, means for selectively controlling said passages including normally-closed valves in said passages, and manually controlled electrical means for opening the valves, substantially as set forth.

10. In a motor vehicle, braking means, a piston connected thereto, a pipe leading from the intake side of the motor for exhausting the air over the piston, a plurality of passages leading from said pipe through the cylinder head, a valve normally closing said passages, a piston for lifting said valve, a vacuum chamber at one side of the piston, independent passages from said pipe to said chamber opening thereinto at different heights, means for selectively controlling said passages including normally-closed valves in said passages, manually controlled electrical means for opening the valves, and yielding connections between said first-named valve and the piston actuated thereby, substantially as set forth.

11. In a motor vehicle, braking means, a piston connected thereto, a pipe leading from the intake side of the motor for exhausting the air over the piston, a plurality of passages leading from said pipe through the cylinder head, a valve normally closing said passages, a piston for lifting said valve, a vacuum chamber at one side of the piston, independent passages from said pipe to said chamber opening thereinto at different heights, means for selectively controlling said passages including normally-closed valves in said passages, manually controlled electrical means for opening the valves, yielding connections between said first-named valve and the piston actuated thereby, and means for yieldingly opposing the movement of the last-named piston with its operating valve, substantially as set forth.

12. In a motor vehicle, braking means, a piston connected thereto, a pipe leading from the intake side of the motor for exhausting the air over the piston, a plurality of passages leading from said pipe through the cylinder head, a valve normally closing said passages, a piston for lifting said valve, a vacuum chamber at one side of the piston, independent passages from said pipe to said chamber opening thereinto at different heights, means for selectively controlling said passages including normally-closed valves in said passages, manually controlled electrical means for opening the valves, and means for adjustably limiting the movement of said first-named valve, substantially as set forth.

13. A braking mechanism as in claim 2, with independent circuits for said brake applications, and independent resilient means for breaking the respective circuits, substantially as set forth.

14. In a motor vehicle, braking means, vacuum actuated operating means therefor including a brake cylinder, a piston in said cylinder adapted to be operated by suction from the intake manifold for applying the brakes, an auxiliary cylinder having communication with said first mentioned cylinder adapted for applying the actuating medium gradually or rapidly to said cylinder, and a communicating passage between the remote ends of said cylinders for establishing a balance of pressure in said cylinders, substantially as set forth.

In witness whereof, I have hereunto set my hand and seal at Indianapolis, Indiana, this 28th day of February, A. D. nineteen hundred and twenty-five.

NORMAN H. GILMAN. [L. S.]